United States Patent
Roach

(10) Patent No.: US 10,992,710 B2
(45) Date of Patent: Apr. 27, 2021

(54) NETWORK POLICY SERVICE FOR DYNAMIC MEDIA

(71) Applicant: NETSWEEPER (BARBADOS) INC., St. Michael (BB)

(72) Inventor: Perry Roach, Waterloo (CA)

(73) Assignee: NETSWEEPER (BARBADOS) INC., St. Michael (BB)

( * ) Notice: Subject to any disclaimer, the term of this patent is extended or adjusted under 35 U.S.C. 154(b) by 228 days.

(21) Appl. No.: 15/024,499

(22) PCT Filed: Sep. 24, 2013

(86) PCT No.: PCT/CA2013/000811
§ 371 (c)(1),
(2) Date: Mar. 24, 2016

(87) PCT Pub. No.: WO2015/042681
PCT Pub. Date: Apr. 2, 2015

(65) Prior Publication Data
US 2016/0234256 A1    Aug. 11, 2016

(51) Int. Cl.
*H04L 29/06*    (2006.01)
*H04L 9/32*    (2006.01)
(Continued)

(52) U.S. Cl.
CPC ............. *H04L 63/20* (2013.01); *G06F 21/10* (2013.01); *H04L 9/32* (2013.01); *H04L 41/0893* (2013.01);
(Continued)

(58) Field of Classification Search
CPC ..... H04L 63/0245; H04L 63/20; H04L 63/10; G06F 21/10
See application file for complete search history.

(56) References Cited

U.S. PATENT DOCUMENTS 7,058,633 B1 * 6/2006 Gnagy .............. G06F 17/30887
7,272,631 B2    9/2007 Shuster
(Continued)

FOREIGN PATENT DOCUMENTS

WO    2011004258 A2    1/2011

OTHER PUBLICATIONS

International Search Report issued by the Canadian Intellectual Property Office dated Mar. 6, 2014 for corresponding International Patent Application No. PCT/CA2013/000811 filed Sep. 24, 2013.
(Continued)

*Primary Examiner* — David J Pearson
(74) *Attorney, Agent, or Firm* — Perry + Currier Inc.

(57) ABSTRACT

Processing network requests includes receiving a request for a target media element available at a requested location. The request can identify a media repository that stores the target media element. A substitute media element that has content approximately equivalent to content of the target media element can be determined. The substitute media element can be stored on a sub-network connected to the network. A selection page having a link to the location of the substitute media element on the sub-network can be generated. A response to the request for the target media element can include the selection page, so as to offer a user a choice of media source.

18 Claims, 9 Drawing Sheets

(51) Int. Cl.
*H04L 12/24* (2006.01)
*G06F 21/10* (2013.01)

(52) U.S. Cl.
CPC .......... *H04L 63/0245* (2013.01); *H04L 63/08* (2013.01); *G06F 2221/2119* (2013.01)

(56) References Cited

U.S. PATENT DOCUMENTS

| | | | |
|---|---|---|---|
| 7,567,800 | B2 | 7/2009 | Uematsu et al. |
| 10,506,305 | B1 * | 12/2019 | Nijim .................. H04N 21/4722 |
| 2004/0167984 | A1 | 8/2004 | Herrmann |
| 2005/0010567 | A1 | 1/2005 | Barth et al. |
| 2005/0021862 | A1 * | 1/2005 | Schroeder .............. G06Q 30/02 709/246 |
| 2005/0071748 | A1 * | 3/2005 | Shipp ................ G06F 17/30887 715/205 |
| 2005/0144297 | A1 | 6/2005 | Dahlstrom et al. |
| 2008/0072306 | A1 * | 3/2008 | Krasnoiarov ....... H04L 63/0227 726/12 |
| 2008/0109473 | A1 | 5/2008 | Dixon et al. |
| 2008/0275888 | A1 * | 11/2008 | Shuster .............. G06F 17/30867 |
| 2010/0274870 | A1 | 10/2010 | Cremin et al. |
| 2011/0030058 | A1 | 2/2011 | Ben-Itzhak et al. |
| 2011/0145435 | A1 | 6/2011 | Bhatawdekar et al. |
| 2011/0321160 | A1 * | 12/2011 | Mohandas .............. G06F 21/56 726/22 |
| 2012/0166483 | A1 * | 6/2012 | Choudhary ......... G06F 16/2471 707/770 |
| 2014/0280272 | A1 * | 9/2014 | Choque ............. G06F 17/30017 707/758 |
| 2014/0283108 | A1 * | 9/2014 | Torgerson ............... G06F 21/10 726/27 |

OTHER PUBLICATIONS

Written Opinion of the International Authority issued by the Canadian Intellectual Property Office dated Mar. 6, 2014 for corresponding International Patent Application No. PCT/CA2013/000811 filed Sep. 24, 2013.

* cited by examiner

POLICY DATABASE 120

| URL OF TARGET MEDIA ELEMENT 122 | CATEGORY 124 | SUBSTITUTE MEDIA ELEMENT 126 |
|---|---|---|
| http://www.badtorrents.com/breakfastclub.torrent | Torrent | http://movies.isp.com/80s/breakfastclub.htm |
| http://www.youtube.com/watch?v=67tNwTtH0qE | Streaming video | http://video.isp.com |
| http://www.freemusicplace.com/dreamssoreal.mp3 | Unlicensed music | http://www.musicstore.com/dreamssoreal.mp3 |
| ... | ... | ... |
| http://*beatles*mp3 | Unlicensed music | http://www.musicstore.com/thebeatles.htm |

FIG. 5

| 160 | Movies | Music | My Account |

SUBSTITUTE MEDIA ELEMENT PRESENTATION
156

ISP is proud to present the 80s classic movie, The Breakfast Club, starring...

Click to begin the movie. Your account may be charged.
↙ 158

POLICY MESSAGE
152

Be careful when using Bit Torrent sites. Bit Torrent may contain dangerous malware and unauthorized software. Usage of illegal Bit Torrent is prohibited by local law.

❗ Breakfastclub.torrent – Potentially Dangerous

[ 154 Continue Anyway ]

| 200 | Music - Pop - Metric |
|---|---|
| POLICY MESSAGE<br>192<br><br>The song that you requested is unlicensed.<br><br>Artists receive no payment for their hard work when you download unlicensed music.<br><br>[ 194 Download Anyway ] | SUBSTITUTE MEDIA ELEMENT PRESENTATION<br>196<br><br>Message from the artist: Thank you for supporting our work!<br><br>Synthetica ($6.99)<br><br>Artificial Nocturne ($0.99)<br>Youth Without Youth ($0.99)<br>Speed the Collapse ($0.99)<br>Breathing Underwater ($0.99)<br>198 → Dreams So Real ($0.99)<br>Lost Kitten ($0.99)<br>The Void ($0.99) |

| POLICY MESSAGE<br>192<br><br>The song that you requested is unlicensed.<br><br>Artists receive no payment for their hard work when you download unlicensed music.<br><br>[ 194 Download Anyway ] | SUBSTITUTE MEDIA ELEMENT SOURCE<br>242<br><br>Download "Dreams So Real" from MEDIA STORE for<br>$0.99 | SUBSTITUTE MEDIA ELEMENT SOURCE<br>244<br><br>Download "Dreams So Real" from SONG PLACE for<br>$0.88 |
|---|---|---|
| | SUBSTITUTE MEDIA ELEMENT SOURCE<br>246<br><br>Download "Dreams So Real" from POP HAVEN for<br>$1.19 | SUBSTITUTE MEDIA ELEMENT SOURCE<br>248<br><br>Download "Dreams So Real" from MUSIC DEN for<br>$0.79 |

NETWORK POLICY SERVICE FOR DYNAMIC MEDIA

TECHNICAL FIELD

This disclosure relates to computers and, more specifically, to network policy services.

BACKGROUND ART

Network policies can be used to prevent undesirable webpages from being retrieved by a computer. Such webpages can include malicious code that detrimentally modifies the behaviour of the retrieving computer or can include adult-oriented material that is unsuitable for viewing by a child that has access to the computer. Certain types of content may also be illegal in some jurisdictions.

In recent years, different types of content and interactions (e.g., peer-to-peer or decentralized file distribution, music and movie downloads or streaming, etc.) that are facilitated by the Web have been developed. Many known network policy systems fail to keep up with the constantly evolving nature of online content. Where known systems apply policy to different kinds of content and interactions, such policy is often simply to deny the request without offering users any alternative.

SUMMARY OF INVENTION

According to one aspect of this disclosure, a method of processing network requests includes receiving a request via a network for a target media element at a requested location, the request identifying a media repository that stores the target media element. The method further includes processing the request to determine a substitute media element that has content approximately equivalent to content of the target media element. The substitute media element is stored on a sub-network connected to the network. The method further includes generating a selection page having a substitute link to the location of the substitute media element on the sub-network, and responding to the request with the selection page.

According to another aspect of this disclosure, a system includes one or more computers configured to receive a request via a network for a target media element at a requested location, the request identifying a media repository that stores the target media element. The one or more computers are further configured to process the request to determine a substitute media element that has content approximately equivalent to content of the target media element. The substitute media element is stored on a sub-network connected to the network. The one or more computers are further configured to generate a selection page having a substitute link to the location of the substitute media element on the sub-network, and respond to the request with the selection page.

BRIEF DESCRIPTION OF DRAWINGS

The drawings illustrate, by way of example only, embodiments of the present disclosure.

FIG. 5 is an example of a policy database.
FIGS. 6-8 are diagrams of various selection pages.
FIG. 10 is a diagram of another selection page.

DESCRIPTION OF EMBODIMENTS

The techniques described herein can allow for granular policy enforcement for different types of content and interactions (e.g., peer-to-peer or decentralized file distribution, music and movie downloads or streaming, etc.). Such policy enforcement can further intelligently provide alternatives (e.g., legitimate or preferred download/streaming sites, music/movie stores, etc.) to requesting users. Types of content contemplated include media elements such as movies/films, music, podcasts, TV shows, and similar types of dynamic playback media.

Figure 1:
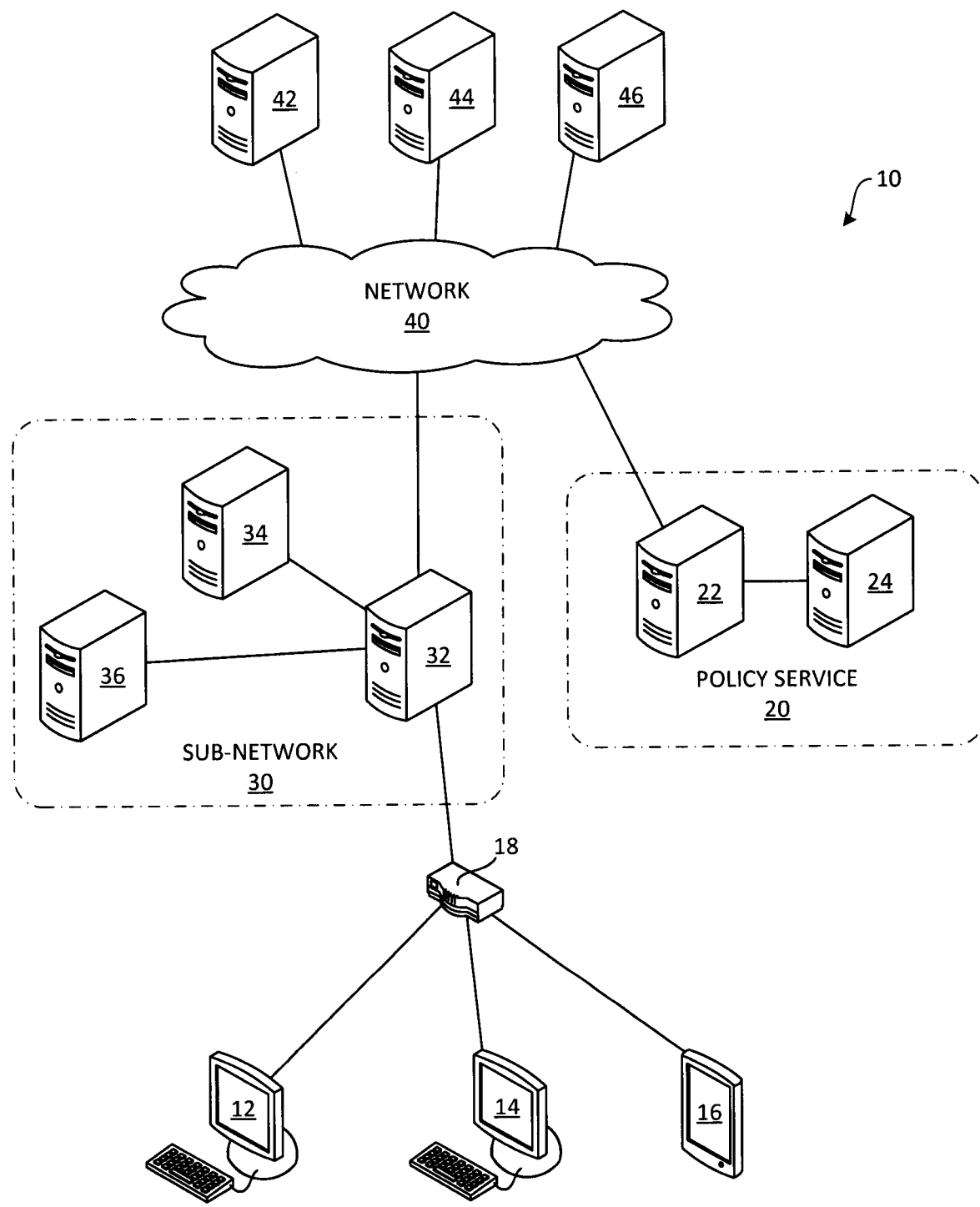
FIG. 1 is a network diagram of a computer system.

FIG. 1 is a diagram illustrating a computer system 10 in accordance with an embodiment of this disclosure. The computer system 10 includes multiple client computers 12, 14, 16 that access a network 40 and various media repositories 42, 44, 46 via a one or more network devices 18 and a gateway server 32 of a sub-network 30, which includes one or more content servers 34 and one or more account servers 36.

The one or more network devices 18 connect the client computers 12, 14, 16 to the network 40 via the gateway server 32. The network devices 18 may be modems that provide access to the network 40 for the computers 12, 14, 16. The network devices 18 may further include devices such as switches, hubs, routers, network cables, wireless access points, fiber-optic lines, and the like.

The network 40 may include switches, hubs, routers, network cables, wireless access points, fiber-optic lines, computers, servers, and other network devices that provide for data communication between the policy service 20, the sub-network 30, and sources of content, such as media repositories 42, 44, 46. The network 40 can be the Internet or a portion thereof.

The media repositories 42, 44, 46 are accessible to the client computers 12, 14, 16 and can include file transfer protocol (FTP) servers, media service, streaming media servers, application servers, and the like. As such, the media elements available include media files, streaming video and audio, and similar content. The media repositories 42, 44, 46 operate at one or more host names (e.g., www.example-.com). Furthermore, the media repositories 42, 44, 46 may also include various client computers (such as computers 12, 14, 16) that supply media files or portions thereof via peer-to-peer or decentralized file distribution techniques (e.g., torrents). In such cases, media repositories 42, 44, 46 may include one or more servers that have links to initiate downloading of peer-to-peer or decentralized files and tracker computers that assist in coordinating downloads.

The policy service 20 can include various components such as a filter, a policy server, a message server, and a log server. For explanatory purposes, the policy service 20 will be described in terms of a filter 22 and a policy server 24. However, it should be understood that more or fewer servers can form the policy service 20, and that different processes and functions can be allotted to different servers in a myriad of ways. Functionality described herein with respect to several servers can be performed by fewer servers or even a single server, with any associated communications between physical servers described herein being configured instead as communications between processes. For example, the filter 22 and the policy server 24 can be implemented on different servers, the same server, or as a process on a client computer 12, 14, 16. In this embodiment, the policy service 20 is out-of-band with network requests and responses between the computers 12, 14, 16 and the network 40.

The filter 22 is configured to process requests by the client computers 12, 14, 16 for access to remote network resources hosted on media repositories 42, 44, 46. In some embodiments, the filter 22 includes a layer 7 deep packet inspection (DPI) filter.

The policy service 20 is configured to apply resource access policy to restrict access to content, such that for each remote resource request made by the computers 12, 14, 16, the filter 22 requests a policy decision from the policy server 24. The filter 22 passes a location of the remote resource, such as a URL, hostname, domain, etc., to the policy server 24 along with any user identity information received with the request. If the filter 22 receives a denial from the policy server 24, the filter 22 generates a selection page and redirects the requesting computer 12, 14, 16 to the selection page. The filter 22 is configured to redirect user agents of the client computers 12, 14, 16 to locations that appear as redirects from the requested host/domain. The response speed of the policy service 20 is configured to be faster than the actual response of the requested host/domain.

Identity information may be unique to the user, such as name or identification number, or may be a broader group-based characteristic, such as the user's age group, sex, organizational role (e.g., minor student, student at age of majority, teacher, parent, etc.), country, or legal jurisdiction (e.g., state, province, territory, city, special economic zone, etc.). The identity may include a combination of several characteristics. Identity information can be provided by the user by way of, for example, a login credential that is stored at the computer 12, 14, 16 (e.g., in a cookie). Identity information can also be determined by the policy service 20 based on the content of requests. For example, the request may include an IP address that can be mapped to a country or legal jurisdiction.

The policy server 24 is configured to determine whether a restrictive resource access policy applies to the requested resource. Restrictive policy may be based on the identity information of the user and the requested content, may be based on the requested content without regard to the identity information of the user (e.g., all users are subject to the same policy), or may be group-based, such as described in WO2011/004258, which is incorporated herein by reference. In some embodiments, the policy server 24 stores a policy database (see FIG. 5).

Regarding the sub-network 30, the gateway server 32 may be provided and administered by an organization, such as an Internet service provider, school system, government, company, or the like, that provides access to the network 40 for the client computers 12, 14, 16. The gateway server 32 handles requests and responses to the client computers 12, 14, 16 and maps the client computers 12, 14, 16 to shared IP addresses, if required.

The gateway server 32 is configured to make policy requests to the out-of-band policy service 20. In some embodiments, all requests for external resources are mirrored to the policy service 20. As mentioned, the filter 22 is configured to redirect user agents of the client computers 12, 14, 16 to locations that appear as redirects from the requested host/domain. Accordingly, the gateway 32 provides incoming redirects from the filter 22 to the user agents of the computers 12, 14, 16 as responses from the requested host/domain. The response speed of the policy service 20 is configured to be faster than the actual response of the requested host/domain, so that the gateway 32 ignores or discards the actual response of the requested host/domain.

The content server 34 of the sub-network 30 may be configured to store media elements, such as video, music, and the like, as similar to the repositories 42, 44, 46. The content server 34 may be generally accessible or may be restricted to access by the computers 12, 14, 16 associated with the gateway 32.

The account server 36 of the sub-network 30 may be configured to store account information of users of the computers 12, 14, 16. Such information may include network access credentials, user identity information, personal information (e.g., name, address, etc.), billing information, and similar.

Figure 2:
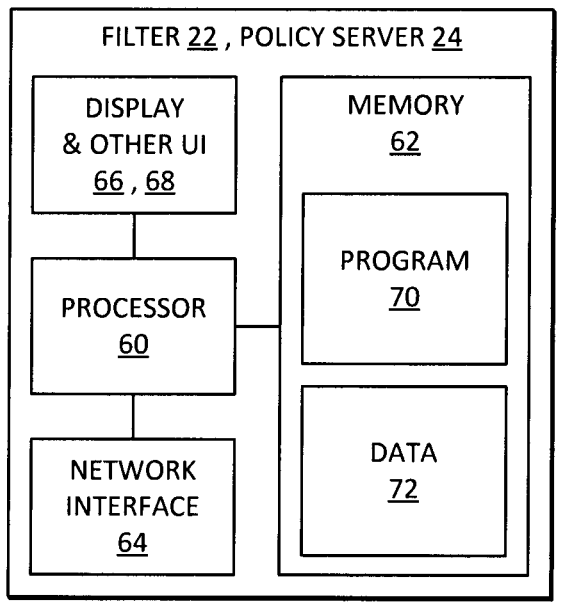
FIG. 2 is a block diagram of a server.

FIG. 2 shows an example computer, or server, that can be used as any of the filter 22, policy server 24, gateway 32, content server 34, account server 36, and media repositories 42, 44, 46.

The server can include a processor 60, memory 62, a network interface 64, and can further include a display 66 and other user interface components 68. The processor 60, memory 62, network interface 64, and display 66 and other user interface 68 are electrically interconnected and can be physically contained within a housing or frame. The server may be a computer such as a rack-mount server, blade server, tower server, or another kind of computer, or a process or program running on such a computer.

The processor 60 is configured to execute instructions, which may originate from the memory 62 or the network interface 64. The processor 60 may be known a central processing unit (CPU). The processor 60 can include one or more sub-processors or processing cores.

The memory 62 includes a non-transitory computer-readable medium that is configured to store programs and data. The memory 62 can include one or more short-term or long-term storage devices, such as a solid-state memory chip (e.g., DRAM, ROM, non-volatile flash memory), a hard drive, an optical storage disc, and similar. The memory 62 can include fixed components that are not physically removable from the server (e.g., fixed hard drives) as well as removable components (e.g., removable memory cards). The memory 62 allows for random access, in that programs and data may be both read and written.

The network interface 64 is configured to allow the server to communicate with other computers across a network. The network interface 64 can include one or more of a wired and wireless network adaptor and well as a software or firmware driver for controlling such adaptor.

The display 66 and other user interface components 68, if provided, can include a display device, such as a monitor, a bank of light-emitting diodes (LEDs), or similar for monitoring operations of the server. The user interface 68 can include an input device, such as a keyboard, mouse, touch-sensitive element of a touch-screen display, or similar device. The user interface 68 can be remote to the server and provided via the network interface 64 to a client computer operated by a remote administrator.

Although the filter 22 and policy server 24 may have similar components, as described above, each of the filter 22 and the policy server 24 may be configured in a manner selected for its purpose as described elsewhere herein. For example, the policy server 24 may be configured for high storage capacity (e.g., much memory 62), while the filter 22 may be configured for high processing speeds (e.g., multiple advanced processors 60).

One or more programs 70 can be provided to each of the filter 22 and policy server 24 to carry out the processes described herein. Such programs 70 may reference data 72 in the form of databases, files, or other data structures.

Figure 3:
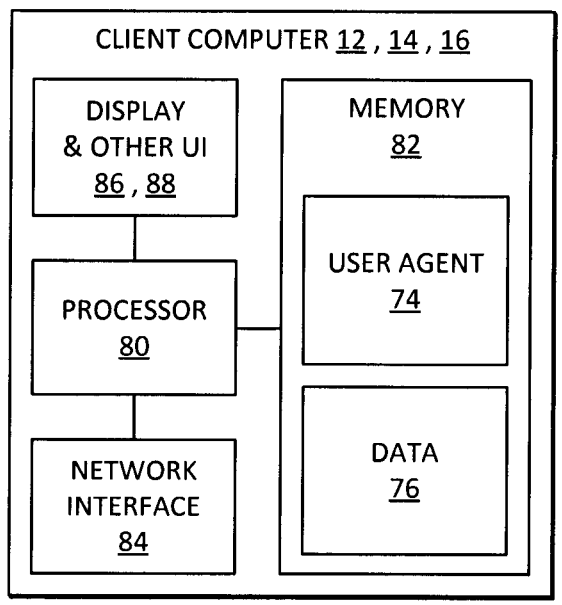
FIG. 3 is a block diagram of a client computer.

FIG. 3 shows an example computer that can be used as any of the client computers 12, 14, 16. The computer includes a processor 80, memory 82, a network interface 84, and a display 86 and other user interface components 88. The processor 80, memory 82, network interface 84, and display 86 and user interface 88 are electrically interconnected and can be physically contained within a housing or frame. The client computers 12, 14, 16 may each be a computer such as a desktop computer, notebook computer, tablet computer, smart phone, netbook, video game or entertainment console, and the like.

The processor 80 is configured to execute instructions, which may originate from the memory 82 or the network interface 84. The processor 80 may be known a CPU. The processor 80 can include one or more sub-processors or processing cores.

The memory 82 includes a non-transitory computer-readable medium that is configured to store programs and data. The memory 82 can include one or more short-term or long-term storage devices, such as a solid-state memory chip (e.g., DRAM, ROM, non-volatile flash memory), a hard drive, an optical storage disc, and similar. The memory 82 can include fixed components that are not physically removable from the client computer (e.g., fixed hard drives) as well as removable components (e.g., removable memory cards). The memory 82 allows for random access, in that programs and data may be both read and written.

The network interface 84 is configured to allow the client computer 12, 14, 16 to communicate with other computers across a network. The network interface 84 can include one or more of a wired and wireless network adaptor and well as a software or firmware driver for controlling such adaptor.

The display 86 and other user interface components 88 can include a display device, such as a monitor and an input device, such as a keyboard, keypad, mouse, touch-sensitive element of a touch-screen display, or similar device. Although the term "click" is used herein with respect to links (hyperlinks), this term should be taken to mean any user interface action that follows a hyperlink, such as a touch, tap-and-hold, and the like.

Each of the client computers 12, 14, 16 is configured to run a user agent, such as a web browser 74, suitable for the type of content being accessed. The web browser 74 may reference locally stored data 76, which can include cookies and similar information. Other examples of suitable user agent include a voice over IP (VOIP) client, a video chat client, and a file-sharing client, among others.

Figure 4:
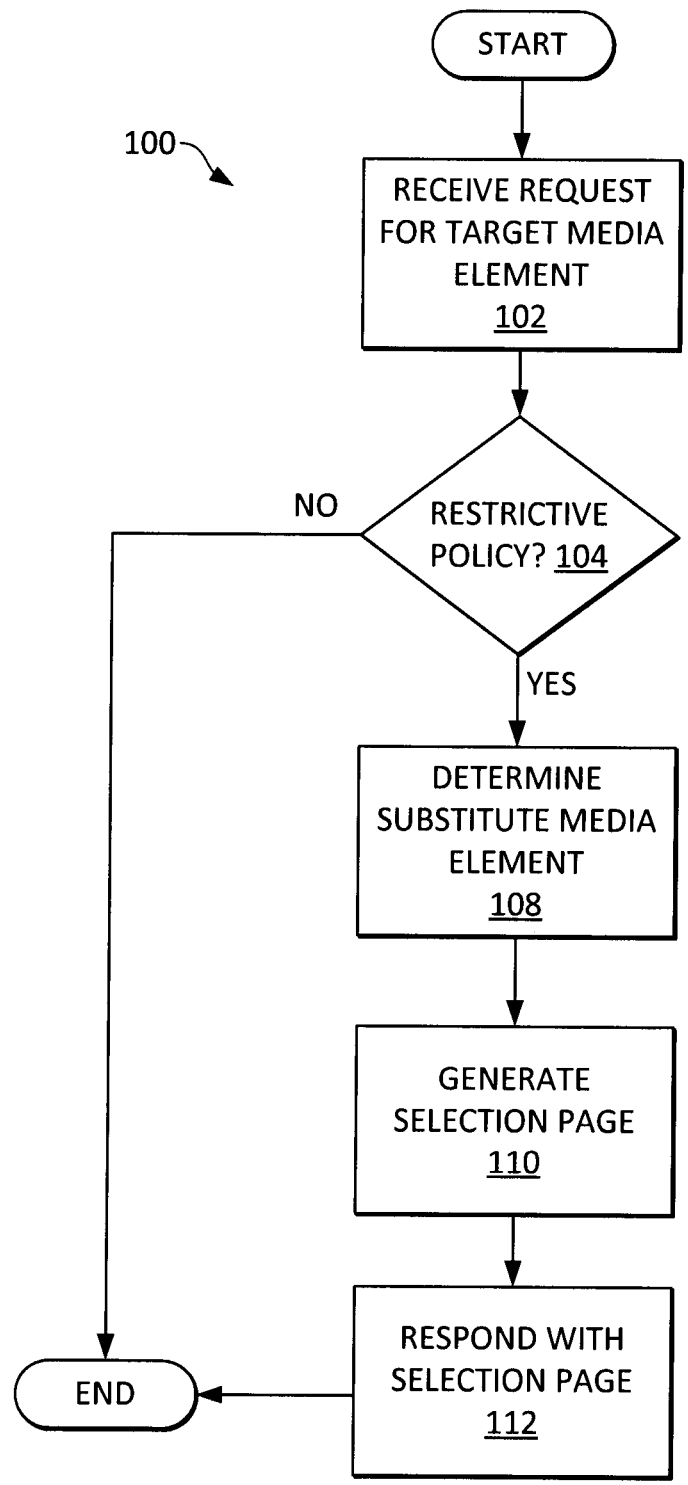
FIG. 4 is a flowchart of a method of providing a selection page.

Referring to FIG. 4, a method 100 for processing network requests for media elements is shown. Although, the method 100 is discussed in the context of the computer system 10 of FIG. 1 for explanatory purposes, other computer systems may be used.

At 102, a request for a target media element at a requested location is received via a network from a requesting computer, such as one of the client computers 12, 14, 16 (FIG. 1). The request may be triggered by a user entering a URL into a browser address bar, selecting a bookmarked URL, clicking a link, or similar. The request includes a network location of the media (e.g., a URL specifying a file or web page, an FTP location, or similar). The request can identify the media repository that stores the target media element by way of a hostname, domain name, or IP address in the URL or other location identifier. That is, a request for a video file may be expressed as "http://www.example.com/video1.mpg", where the media repository is "www.example.com".

The request may further include identity information associated with the user at the requesting computer 12, 14, 16, as discussed above. For example, the identity information may be provided in a cookie included with the request.

At 104, it is determined whether the content request is subject to a restrictive policy. A policy database may be queried. FIG. 5 shows an example of a policy database 120 that stores associations between requested URLs 122 of target media elements and locations of substitute media elements 126. If a request for a target media element has a URL 122 in the policy database 120, then the request is processed further. Otherwise, the request is unaffected by policy and it handled normally, which may ultimately result in the target media element being delivered to the requesting computer 12, 14, 16 in response to the request.

Next, at 108, the request is processed further because the target media element URL 122 is in the policy database 120. A substitute media element is determined for the target media element. In some embodiments, the substitute media element has content approximately equivalent to content of the target media element. The term "substitute" is not intended to be limiting. A substitute media element may be an original, licensed, or otherwise legal copy of a media element, whereas a target media element may be an illegal or pirated copy of the media element.

In one example, the substitute media element is a longer version of the target media element, and so encompasses the target media element. This may occur when the substitute media element is the full version of a movie that has been broken up into parts as different target media elements. In another example, the substitute media element contains a partial portion of the target media element. This may occur when content has been deleted from a media element, such as deletion of advertisements, credits, or opening sequences from a TV show. In still another example, the substitute media element is substantially identical to the target media element, except for advertisements or similar content. This may occur, when both the substitute media element and the target media element contain advertisements, but such advertisements are different in their content, time positions, or lengths. In yet another example, the substitute media element is identical to the target media element, which may occur when the target media element is an exact copy of the substitute media element. All of the foregoing examples, as well as other examples, can be considered as the substitute media element having content approximately equivalent to content of the target media element.

Associations of substitute media elements 126 with target media element URLs 122 may be created manually or automatically. In manual creation, an administrator views or listens to target and substitute media elements, assesses approximate equivalence, and adds rows to the policy database 120, as appropriate. Automatic creation can compare filenames and/or file metadata to determine which substitute media element corresponds to a particular target media element. Another automatic association creation technique can employ known algorithms that compare media file content.

Substitute media elements may be stored on the sub-network 30. For instance, an Internet service provider that operates the sub-network 30 may store substitute media elements at the content server 34 of the sub-network 30. Substitute media elements may, alternatively or additionally, be stored at various media repositories 42, 44, 46. For example, a particular target media element may be stored at a particular media repository 42, 44, 46 (e.g., an illegal or unlicensed media file server), and the associated substitute media element may be stored at a different media repository 42, 44, 46 (e.g., a media store).

After a substitute media element has been determined for the requested target media element, a selection page is generated, at 110. The selection page contains a substitute link, which can identify the location of the substitute media element. For instance, the filter 22, or another computer of the policy service 20, may generate a URL containing parameters. The URL may identify a host at the policy service 20, which is configured to execute a script using the parameters to generate the selection page.

Lastly, at 112, the request for the target media element is provided with a response that includes a location, such as a URL, of the selection page. This can be performed by the filter 22 providing a redirect to the gateway 32 as a response to the requesting computer 12, 14, 16. When the computer 12, 14, 16 follows the redirect, a script, if used, is executed and the selection page is shown at the requesting computer 12, 14, 16.

The selection page can be configured to allow the user at the computer 12, 14, 16 to select the substitute media element instead of the originally requested target media element.

FIG. 5 shows an example policy database 120 that associates target media elements with substitute media elements. In addition to target media element URLs 122 and locations of substitute media elements 126, the policy database 120 can store other information, such as a category 124 for the target media element. A category 124 may be used when providing a selection page, and can be passed to a page-generating script as a parameter.

Associations between target media elements and substitute media elements may be made in a myriad of ways and are not particularly limited. For example, an association 132 associates a particular media file (e.g., a torrent file of a film) with an HTML page containing related content, such as a description of the media file and a link to obtain the media in a legitimate way (see FIG. 6). An association 134 maps a particular media stream (e.g., a streaming video) with a host that offers an approximately equivalent media stream (see FIG. 7). An association 136 associates a particular media file (e.g., a music file) with the same media file at another location (see FIG. 8). An association 136 associates a plurality of specific media files using a wildcard (e.g., "*") with an HTML page containing related content, such as a description of the artist and a link to obtain the media files in a legitimate way. The forgoing are merely examples and other examples will be apparent to those of ordinary skill. Many ways of mapping target media elements with locations offering substitute media elements are contemplated. It is advantageous that target media elements, which are unlicensed or unauthorized, can be mapped in a granular manner (e.g., by file or using wildcards) to legitimate sources of substitute media elements that contain approximately the same or identical content. One advantage is that piracy of media can be reduced.

A different policy database 120 may be provided for a group of one or more sub-networks 30, particularly when such group operates in the same legal jurisdiction. For instance, when sub-networks 30 are Internet service provider networks located in a particular country, then a policy database 120 can be provided to the sub-networks 30. This advantageously allows policy and substitute media elements to comply with the laws of the jurisdiction. For example, a video may be under strict copyright in one country, yet may be under looser control in another country. In other examples, each Internet service provider operated sub-network 30 has its own policy database 120.

FIG. 6 shows an example of a selection page 150, as displayed in the web browser 74 of a requesting computer 12, 14, 16. The selection page 150 may be dynamically generated (e.g., by a script or other program, such as PHP, Ruby on Rails, Microsoft ASP, and the like) and provided to the web browser 74 as an HTML/CSS document.

The selection page 150 can include one or more policy message display elements 152 that include a human-intelligible message indicating to the user of the requesting computer 12, 14, 16 that their original content request (e.g., clicked/typed URL) was found to be subject to a restrictive policy. The content of the policy message display element 152 can indicate a negative characteristic of the target media element and can be based on the category 124 (FIG. 5) of the requested media element. In the example shown, the target media element is a torrent file and the content of the policy message display element 152 expresses potential dangers associated with such.

The selection page 150 can include a target link 154 to the requested location of the target media element. Hence, the user of the requesting computer 12, 14, 16 can click through to the originally requested target media element, if he or she chooses.

The selection page 150 includes a substitute media element presentation area 156 that provides information about the substitute media element and further includes a link 158 to the substitute media element. The substitute media element does not have the negative characteristic of the target media element. Hence, the user can select the substitute link 158 to obtain the substitute media element, that is, a media element approximately equivalent to the target media element but lacking the negative characteristic. In this example, negative characteristics include the potential dangers of torrent files and a high likelihood that the target media element is pirated.

The substitute media element presentation area 156 may be an iframe or similar element whose content is set to content located outside the policy service, such as a webpage of the sub-network 30. The content of the substitute media element presentation area 156 can be so set by, for example, setting a source property of an iframe. For instance, when the sub-network 30 is operated by an ISP, the content of the substitute media element presentation area 156 may be the ISP's webpage for the movie that was originally intended to be obtained via a torrent file. Such a webpage may require login credentials and may trigger a debit of a user's account at the account server 36 of the sub-network 30 if the user selects to play the movie via the substitute link 158.

The selection page 150 can further include other elements, such as a menu bar 160 that provides links to other media elements, advertisements, and similar.

Figure 7:
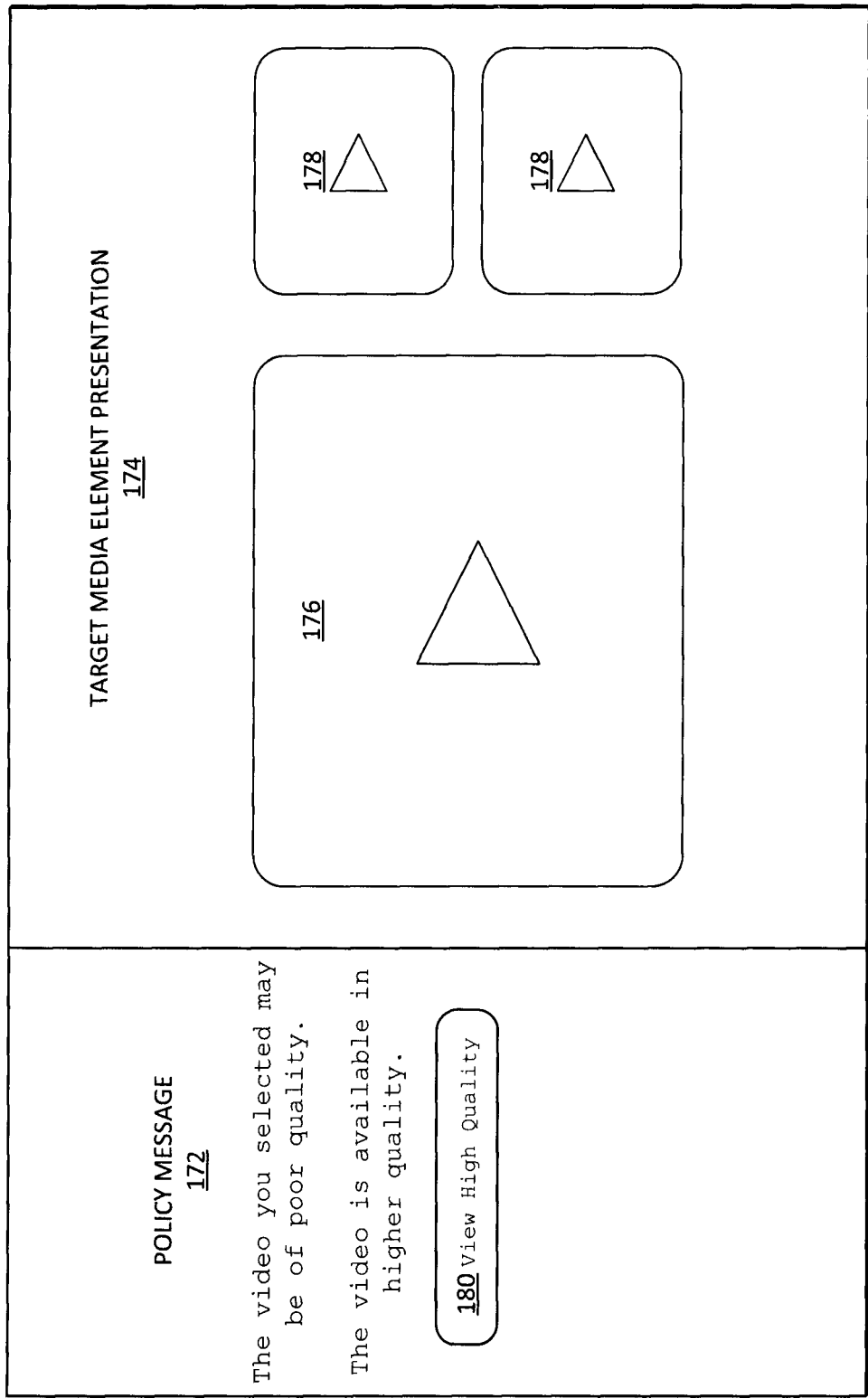

FIG. 7 shows an example of a selection page 170, as displayed in the web browser 74 of a requesting computer 12, 14, 16. The selection page 170 may be dynamically generated and provided to the web browser 74 as an HTML/CSS document.

The selection page 170 can include one or more policy message display elements 172 that include a human-intelligible message indicating to the user of the requesting computer 12, 14, 16 that their original content request (e.g., clicked/typed URL) was found to be subject to a restrictive policy. The content of the policy message display element 172 can indicate a negative characteristic of the target media element and can be based on the category 124 (FIG. 5) of the requested media element. In the example shown, the target media element is a streaming video and the negative characteristic is a reduced audio or visual playback quality (e.g., lower resolution, lower frame rate, lower audio sampling rate, etc.).

The selection page 170 includes a target media element presentation area 174 that provides the target media element 176 that was originally requested. The target media element presentation area 174 can also include other elements 178, such as additional videos for playback from the same source as the target media element. The target media element presentation area 174 may be the hosting page of the target media element 176 provided in an iframe or similar element.

The selection page 170 further includes a link 180 to the location of the substitute media element, which can be hosted at the content server 34 of the sub-network 30, for example. The substitute media element lacks the negative characteristic. For instance, the substitute media element can have increased quality with respect to the target media element. Hence, the user is offered a superior approximately equivalent version of the requested media element at a different source. The substitute media element may have different advertisements or other commercial considerations with respect to the target media element. Thus, the operator of the sub-network 30 may earn revenue from offering the higher quality substitute media element.

In some embodiments, when the sub-network 30 is operated by an ISP and the media repository 42, 44, 46 is outside the control of the ISP. The sub-network 30 may be configured to deliver media elements hosted at the content server 34 at a speed or quality greater than that for approximately equivalent media elements hosted at the media repository 42, 44, 46.

FIG. 8 shows an example of a selection page 190, as displayed in the web browser 74 of a requesting computer 12, 14, 16. The selection page 190 may be dynamically generated and provided to the web browser 74 as an HTML/CSS document.

The selection page 190 can include one or more policy message display elements 192 that include a human-intelligible message indicating to the user of the requesting computer 12, 14, 16 that their original content request (e.g., clicked/typed URL) was found to be subject to a restrictive policy. The content of the policy message display element 192 can indicate a negative characteristic of the target media element and can be based on the category 124 (FIG. 5) of the requested media element. In the example shown, the target media element is a music file (e.g., an mp3 file) the content of the policy message display element 192 expresses that the music is unlicensed.

The selection page 190 can include a target link 194 to the requested location of the target media element. Hence, the user of the requesting computer 12, 14, 16 can click through to the originally requested target media element, if he or she chooses.

The selection page 190 includes a substitute media element presentation area 196 that provides information about the substitute media element and further includes a link 198 to the substitute media element. Information about the substitute media element may include a message from the artist who created the media element, so as to encourage the user to choose to purchase the media element and support the artist. The substitute media element does not have the negative characteristic (e.g., from an unlicensed source) of the target media element, and thus the user can select the substitute link 198 to obtain a media element approximately equivalent to the target media element but lacking the negative characteristic. In this example, the substitute media element is provided by a licenced source, such as the content server 34 of the sub-network 30.

The substitute media element presentation area 196 may be an iframe or similar element whose content is set to content located outside the policy service, such as a webpage of the sub-network 30. The content of the substitute media element presentation area 196 can be so set by, for example, setting a source property of an iframe. For instance, when the sub-network 30 is operated by an ISP, the content of the substitute media element presentation area 196 may be the ISP's webpage for the album or artist of the song that was originally intended to be obtained via downloading an unlicensed mp3 file. Such a webpage may require login credentials and may trigger a debit of a user's account at the account server 36 of the sub-network 30 if the user selects to download or play the song via the substitute link 198.

The selection page 190 can further include other elements, such as a navigation bar 200 that allows navigation to other music hosted by the sub-network 30.

Figure 9:
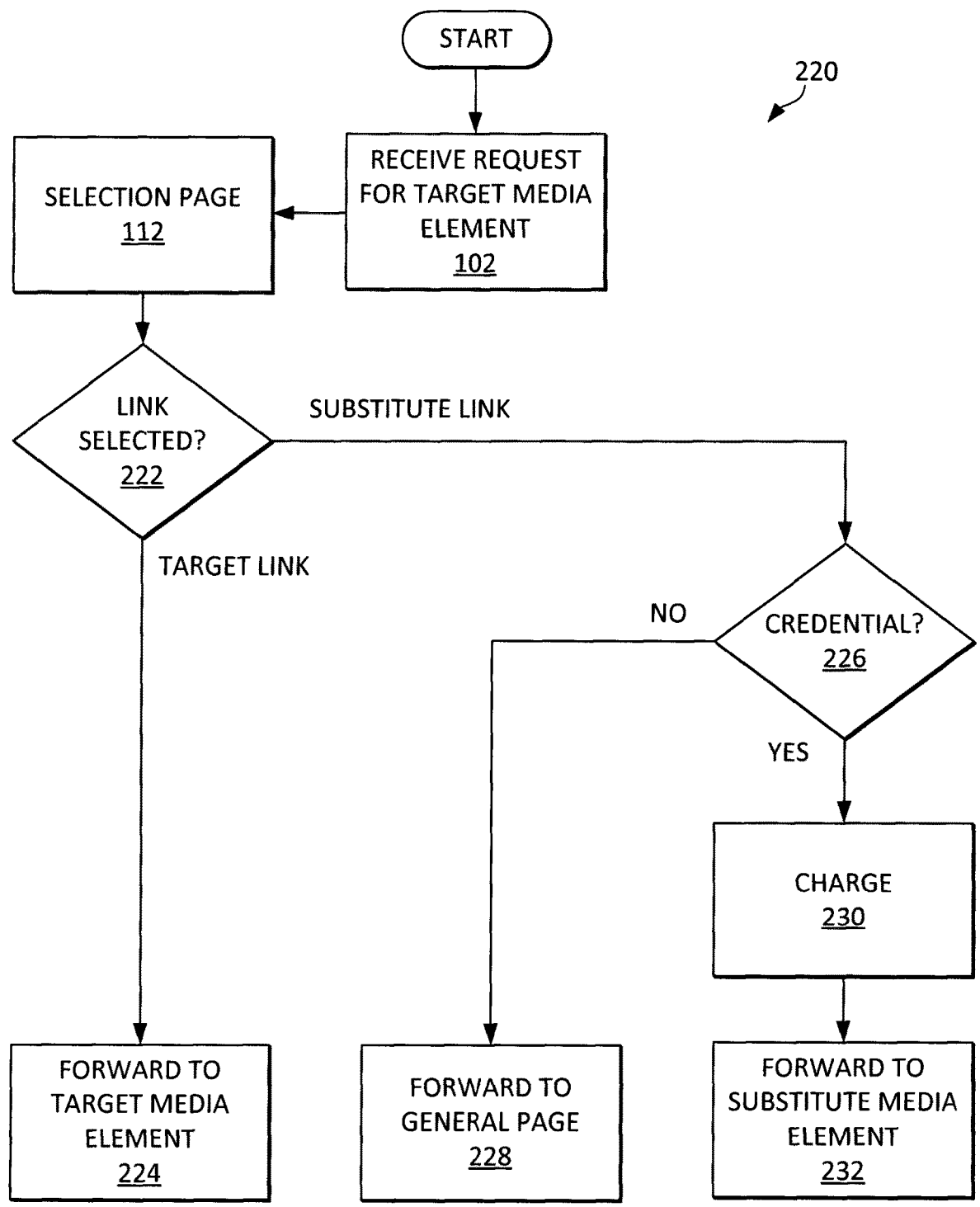
FIG. 9 is a flowchart of a method of processing a selection of a media element.

FIG. 9 shows a method 220 of processing a selection of a media element. For sake of explanation, the method 220 is described in the context of the system 10, the method of FIG. 4, and the selection pages discussed herein.

At 102, a request is made for a target media element. Then, at 112, a selection page is provided to the requesting computer 12, 14, 16. The description of method 100 can be referenced for further detail of these steps and of other steps that may be performed.

At 222, if a link for the target media element is selected at the selection page, then, at 224, the target media element is provided to the requesting computer 12, 14, 16. Examples of such links are links 154, 176, 194 in FIGS. 6-8. Links to target media elements need not be provided, particularly if the target media contains content illegal in the jurisdiction of the requesting computer 12, 14, 16.

If a link for the substitute media element is selected at the selection page (e.g., links 158, 180, 198 of FIGS. 6-8), then a credential for the sub-network 30 is verified, at 226. A credential associated with the requesting computer 12, 14, 16 may be provided to the policy service 20 or the gateway 32 as part of the request and policy enforcement process. Such a credential may be in the form of a cookie. The credential may indicate an account of the sub-network 30 that is associated with the requesting computer 12, 14, 16 and further may indicate that the requesting computer 12, 14, 16 has an active session with such account.

Alternatively or additionally, at 226, a prompt may be issued to the requesting computer 12, 14, 16 to provide authentication against a credential (e.g., enter a username and password). Such a prompt may be provided to the selection page via an iframe that frames a webpage hosted at the sub-network 30.

If the credential cannot be authenticated, then a general page is provided to the requesting computer 12, 14, 16, at 228. The general page can be hosted at the sub-network 30 and can include a form for the user to obtain or confirm their authentication information. For example, the general page can be a registration page or lost-password page.

If the credential is successfully authenticated then the associated account is charged, at 230. Thus, after receiving a selection of the substitute media element by the requesting computer 12, 14, 16, the account associated with the requesting computer is charged for the media element and the media element is delivered to the requesting computer 12, 14, 16, at 232. This advantageously allows the sub-network 30 to provide a media store at which media elements including the substitute media element are for sale.

FIG. 10 shows another example of a selection page 240. The selection page 240 is similar to the selection page 190 and only differences will be discussed in detail.

The selection page 240 includes a policy message display element 192 and a target link 194. The selection page 240 further includes a plurality of substitute media element presentation areas 242-248, which are each associated with a different source of substitute media elements that have content approximately equivalent to the target media element. Each substitute media element presentation area 242-248 can provide a link to the respective substitute media element. Thus, the user can be provided with several choices when deciding to download the media element from a legitimate source.

In view of the above, it should be apparent that users can be provided with various options to obtain media elements (e.g., music, videos, movies, etc.) from same and legitimate sources. It is advantageous that users are given the choice of whether to continue with what may be a harmful or illegal media download/stream or whether to obtain substantially equivalent, identical, or superior content from a legitimate source. Furthermore, it is beneficial to legitimate sellers of media that users are provided with links to legitimate media at the very time that they are in the process of obtaining such media via other means. That is, a user has already decided that he or she wishes to view or listen to a particular media element when the user is provided with the choice to obtain the media element from a legitimate source. This can have the dual benefit of increasing revenues to artists and media companies, while educating and reducing risk to consumers.

Users can be incentivised to choose a legitimate source when provided with a selection page by the human-intelligible content on the selection page. Benefits and drawbacks can be indicated. In addition, media quality can be increased or decreased, and it is contemplated that users will often choose higher quality media even if a small amount of money is charged. Another example of an incentive is that the policy service may log network requests, and users can be reminded that potentially illegal media downloads/streams are being logged.

A further advantage of the techniques described herein is that Internet service providers may be able to divert traffic that might otherwise be over-the-top (OTT) content to paying channels.

While the foregoing provides certain non-limiting example embodiments, it should be understood that combinations, subsets, and variations of the foregoing are contemplated. The monopoly sought is defined by the claims.

The invention claimed is:

1. A method of processing network requests, the method comprising:
   receiving a request via a network for a target media element at a requested uniform resource locator (URL) from a user's computer, the request identifying a media repository that stores the target media element;
   determining and selecting a policy database based on a legal jurisdiction of an internet service provider, the internet service provider providing access to the network for the user's computer;
   determining whether the request is subject to a restrictive policy based on identity information of a user of the user's computer and a geographic location of the user's computer;
   when the request is not subject to the restrictive policy, allowing the user's computer access to the target media element;
   when the request is subject to a restrictive policy, processing the request to determine a substitute media element that has content approximately equivalent to content of the target media element, the processing including querying the policy database that stores associations between target media elements and substitute media elements, the substitute media element stored on a sub-network controlled by the internet service provider connected to the network, a URL of the substitute media element stored on the policy database, the substitute media element compliant with the legal jurisdiction of the internet service provider; and
   when the requested target media element is associated with a substitute media element in the policy database, generating a selection page having a target link to the requested URL of the target media element and a substitute link to the URL of the substitute media element on the sub-network controlled by the internet service provider, the target link juxtaposed to the substitute link on the selection page, and responding to the request with the selection page.

2. The method of claim 1, further comprising authenticating a credential of a requesting computer at which the request originated, the credential associated with an account at the sub-network.

3. The method of claim 2, further comprising charging the account after receiving selection of the substitute media element.

4. The method of claim 1, wherein the sub-network comprises a media store at which media elements including the substitute media element are for sale.

5. The method of claim 1, wherein generating the selection page further comprises providing in the selection page another substitute link to a URL of another substitute media element that has content approximately equivalent to content of the target media element, the substitute media element stored on another sub-network connected to the network.

6. The method of claim 1, wherein generating the selection page comprises providing a human-intelligible message in the selection page, the human-intelligible message indicating a negative characteristic of the target media element.

7. The method of claim 6, wherein the target media element contains unlicensed content, and the substitute media element lacks unlicensed content.

8. The method of claim 6, wherein the target media element is of reduced audio or visual quality, and the substitute media element is of superior audio or visual quality.

9. The method of claim 1, wherein the content of the substitute media element is identical to the content of the target media element.

10. A system comprising:
    one or more computers configured to:
       receive a request via a network for a target media element at a requested uniform resource locator (URL) from a user's computer, the request identifying a media repository that stores the target media element;
       determine and select a policy database based on a legal jurisdiction of an internet service provider, the internet service provider providing access to the network for the user's computer, determine whether the request is subject to a restrictive policy based on identity information of a user of the user's computer and a geographic location of the user's computer;

when the request is not subject to the restrictive policy, allow the user's computer access to the target media element;

when the request is subject to a restrictive policy, query the policy database that stores associations between target media elements and substitute media elements, and process the request to determine a substitute media element that has content approximately equivalent to content of the target media element, the substitute media element stored on a sub-network controlled by the internet service provider connected to the network, a URL of the substitute media element stored on the policy database, the substitute media element compliant with the legal jurisdiction of the internet service provider; and when the requested target media element is associated with a substitute media element in the policy database, generate a selection page having a target link to the requested URL of the target media element and a substitute link to the URL of the substitute media element on the sub-network controlled by the internet service provider, the target link juxtaposed to the substitute link on the selection page; and respond to the request with the selection page.

11. The system of claim 10, wherein the one or more computers is further configured to authenticate a credential of a requesting computer at which the request originated, the credential associated with an account at the sub-network.

12. The system of claim 11, wherein the one or more computers is further configured to charge the account after receiving selection of the substitute media element.

13. The system of claim 10, wherein the sub-network comprises a media store at which media elements including the substitute media element are for sale.

14. The system of claim 10, wherein the one or more computers configured to generate the selection page includes providing in the selection page another substitute link to a URL of another substitute media element that has content approximately equivalent to content of the target media element, the substitute media element stored on another sub-network connected to the network.

15. The system of claim 10, wherein the one or more computers configured to generate the selection page includes providing a human-intelligible message in the selection page, the human-intelligible message indicating a negative characteristic of the target media element.

16. The system of claim 15, wherein the target media element contains unlicensed content, and the substitute media element lacks unlicensed content.

17. The system of claim 15, wherein the target media element is of reduced audio or visual quality, and the substitute media element is of superior audio or visual quality.

18. The system of claim 10, wherein the content of the substitute media element is identical to the content of the target media element.

* * * * *